Sept. 24, 1935.  B. W. BAUGHMAN  2,015,061
VALVE SPRING COMPRESSOR AND LOCK
Filed Nov. 7, 1933
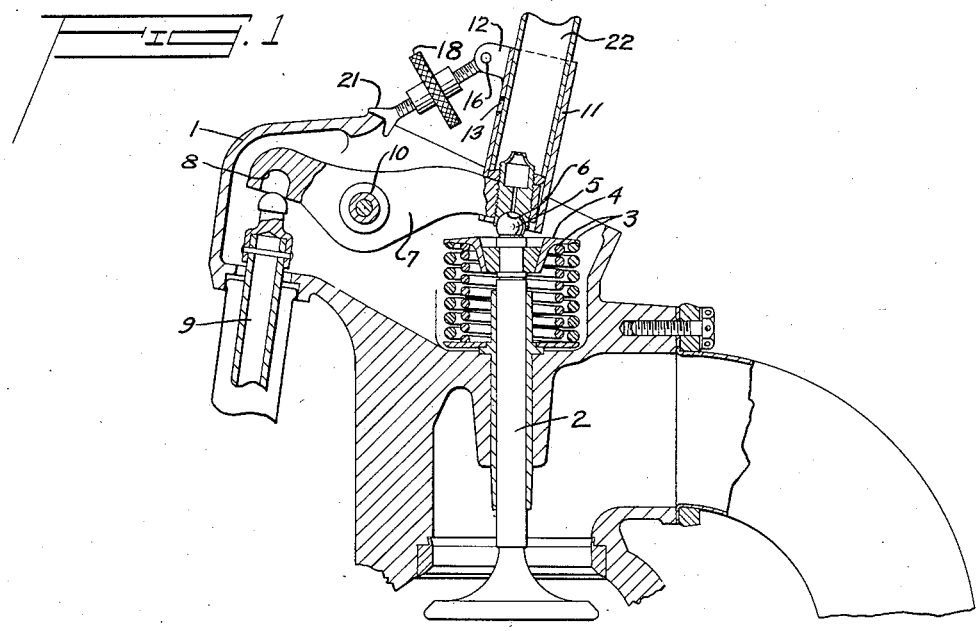
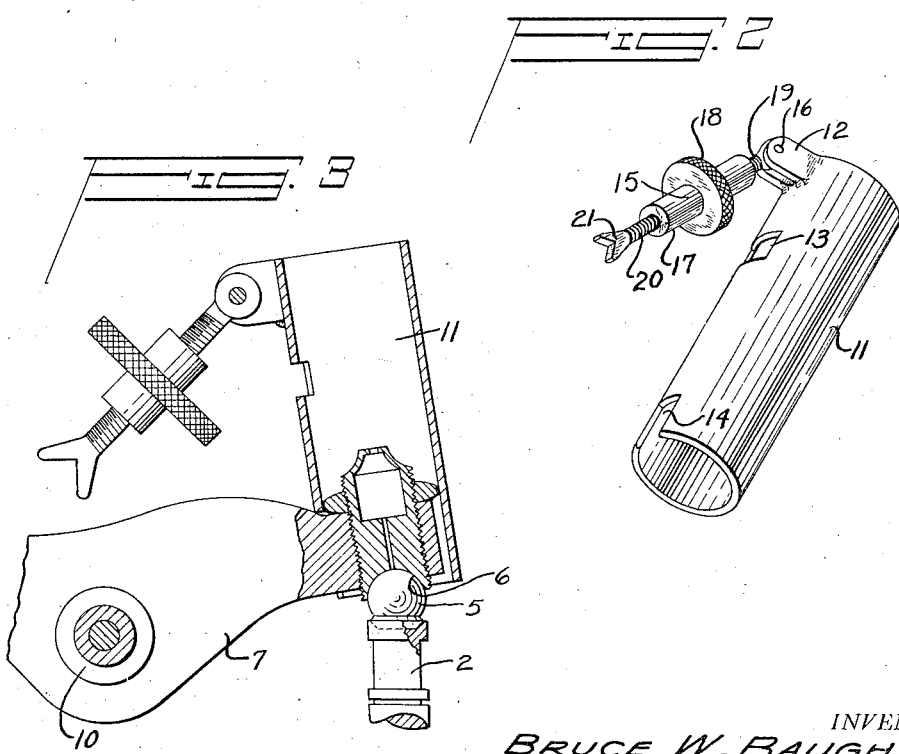
INVENTOR
BRUCE W. BAUGHMAN
ATTORNEYS Patented Sept. 24, 1935

2,015,061

UNITED STATES PATENT OFFICE 2,015,061

VALVE SPRING COMPRESSOR AND LOCK

Bruce W. Baughman, Osborn, Ohio

Application November 7, 1933, Serial No. 697,008

5 Claims. (Cl. 29—86.3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to hand operated mechanic tools for compressing and locking internal combustion engine valve springs.

It is well known that the valves of internal combustion engines are maintained upon their seats by springs. When, for purposes of maintenance or repair, it is desired to compress and lock a valve spring, some form of force multiplying tool must be employed to overcome the great resilient force exerted by the springs.

A majority of the internal combustion engines installed upon aircraft employ overhead rocker arms to operate the valves proper, these arms being actuated by longitudinal thrust of a like number of push rods operated by a remotely located system of cams. Push rod thrust is transmitted through each rocker arm to compress the valve springs associated therewith and to open the valve retaining the same.

In maintaining and repairing aircraft engines, it is frequently necessary to remove the above-mentioned push rods for lubrication, examination or replacement of the same. In order to effect these operations, each valve spring must be compressed to relieve the longitudinal pressure of the rocker arm upon the upper extremity of the push rod.

Tools have been devised heretofore for maintenance and repair purposes, but have either proved inefficient and inconvenient to use, thus exposing the user to danger of injury, or if efficient, have proved cumbersome in size and unnecessarily complicated as to number of component parts employed. Any tool used for this purpose must be applied to the engine as built by the manufacturer and due to limited space in which such a tool may be operated and to the unusual shape of the parts engaged by said tool and due to further causes which will be understood by those skilled in this art; tools heretofore employed frequently slipped when the relatively great forces necessary to compress valve springs were applied. Such slippage often occurs when an attempt is made to remove or inspect the push rod. Such premature release of the valve springs, involving extremely rapid movement of the same and parts associated therewith, have heretofore caused serious injuries either through directly pinching the mechanic's hand or fingers between portions of the relieved rocker arm and push rod or by suddenly throwing free from the engine proper improvised tools applied thereto.

It is an object of this invention to provide a tool of few moving parts and extreme simplicity of operation for the purpose of compressing valve springs of aircraft engines, thereby releasing longitudinal pressure upon the push rod associated therewith.

It is another object of my invention, having compressed the valve springs of an aircraft engine, to provide a tool by which said valve springs may be secured in compressed position, whereby both hands of the user may be free to perform work in connection with maintenance or repair of the aircraft engine to which my invention is attached.

A still further object of my invention is to provide a tool of the character described at low initial cost, and one which will require relatively small storage space in the tool kit provided as a component part for each aircraft engine.

With the foregoing and other objects in view, which will appear as the description proceeds, the invention consists of certain new and novel improvements in valve spring compressors and locks, which will be hereinafter more fully illustrated and described in the accompanying drawing and more particularly pointed out in the appended claims.

Referring to the drawing in which numerals of like character designate similar parts throughout the several views:

Fig. 1 is a side elevation of my invention, in partial cross section, depicting compression and locking of the valve springs of an aircraft engine.

Fig. 2 shows a semi-enlargement of my invention in side perspective.

Fig. 3 is an enlarged side elevation of my invention, in partial cross-section, loosely engaged with the rocker arm of an aircraft engine.

Fig. 1 shows a portion of the rocker arm housing and valve mechanism of an internal combustion engine applicable to aircraft, comprising a housing 1, a valve 2, twin helical springs 3 and spring returning means 4. The upper extremity of the valve 2 is provided with a removable ball 5 adapted to operatively engage a socket 6 adjustably secured to the valve stem extremity of the rocker arm 7. A fixed socket 8 is provided in the other extremity of the rocker arm 7 for operable engagement with the upper extremity of a push rod 9. The rocker arm 7 is pivotally secured to the housing 1 by means of a bearing 10. It is well known to those skilled in this art that the lower extremity of the push rod 9 communicates with a cam mechanism or like device which periodically imparts upward longitudinal thrust to the push rod 9.

From inspection of Fig. 1, it is readily apparent that upward thrust of the push rod 9 will rotate the rocker arm 7 in a clockwise direction around the bearing 10, resulting in downward thrust of the valve 2 to the open position shown. The same clockwise rotation of the rocker arm 7 may be accomplished without upward thrust of the push rod 9 through use of my invention in the manner set forth below. It will be noted that rotation accomplished through the last named method causes the fixed socket 8 of the rocker arm 7 to be disengaged from the upper extremity of the push rod 9, thereby permitting ready removal of the push rod 9, the lower extremity of which is no longer pressed against the actuating mechanism supporting the same.

From inspection of Figs. 1 and 2, it will be seen that my invention comprises a tubular body 11, the upper extremity of which is provided with outwardly extending lugs 12 fixedly attached thereto and having an opening 13 immediately below the lugs 12 and a notched opening 14 provided at the lower extremity of the tubular body 11. A turnbuckle 15 is pivotally secured to the lugs 12 by means of a pin 16. The turnbuckle 15 is comprised of a barrel portion 17, a thumb engaging disc 18 and screw portions 19 and 20. The outer extremity of the screw portion 20 terminates in a yoke 21. It will be noted that the inner portion of the tubular body 11 has been left entirely free of inwardly extending obstructions. It is thus possible for the user to insert within the tubular body 11 a solid or tubular member, such as a tube 22 shown in Fig. 1, to serve as a hand grasping portion.

Referring to Fig. 3, my invention is shown loosely positioned upon that extremity of the rocker arm 7 which lies immediately above the valve 2. The aforementioned extremity of the rocker arm 7 is lug shaped in plan view, the body portion of the rocker arm 7 being relatively narrow in vertical cross section. The notched opening 14 provided in the tubular body 11 incorporates just sufficient width to snugly fit the aforementioned necked-down portion of the rocker arm 7. It is of course to be understood that some leeway must be provided, where unmachined surfaces of engine parts are to be contacted by machined surfaces such as those provided in the notched opening 14. Following insertion of the tube 22 shown in Fig. 1, within the tubular body 11, the tubular body 11 is subjected to clockwise rotation about the bearing 10. The lower right hand portion of the tubular body 11 is thus brought into positive engagement with the outer lower portion of the lug shaped extremity of the rocker arm 7. At the same time that portion of the tubular body 11 lying immediately adjacent to the upper extremity of the notched opening 14 is brought into positive engagement with the upper inner portion of the lug shaped extremity of the rocker arm 7. Continued clockwise rotation of the tube 22 effects downward movement of the valve 2 into the maximum position shown in Fig. 1.

Following maximum clockwise rotation of the tube 22, the turnbuckle 15 is contracted and the yoke 21 brought into contact with that open edge portion of the housing 1 which lies immediately above the rocker arm 7. Through simple adjustment of the thumb engaging disc 18, my invention is readily fixed in the position shown in Fig. 1. Both hands of the operator are thereupon free to effect removal of the push rod 9. The tube 22 may now be discarded, since clamping action between the lower extremity of the tubular body 11 and the lug shaped portion of the rocker arm 7 prevents longitudinal slippage of the tubular body 11 with reference to the valve 2. Removal of my invention is accomplished through simple reversal of the valve spring compression operation set forth hereinabove.

For storage convenience, the tubular body 11 has been provided with the opening 13 into which the thumb engaging disc 18 of the turnbuckle 15 may be inserted in order to bring the screw portion 20 immediately adjacent to the tubular body 11.

I claim:

1. A tool adapted to be applied to the rocker arm of an internal combustion engine to compress the valve spring thereof and correspondingly relieve the push rod thereof comprising a fitting adapted for engagement at one end with the valve extremity of said rocker arm, and an adjustable means pivotally connected to the other end of said fitting and adapted to engage a fixed part of said engine for locking said rocker arm against rotation toward said push rod.

2. A valve spring compressor and lock adapted to be applied to the rocker arm of a valve gear assembly located in the rocker arm housing of an aircraft engine to relieve the push rod thereof comprising, a tubular body having one end adapted to receive a hand grasping member and the other end adapted to slidably engage the valve extremity of a rocker arm, and means for spacing the first mentioned end of said tubular body from a predetermined portion of said rocker arm housing.

3. A valve spring compressor and lock adapted to be applied to the rocker arm of a valve gear assembly located in the rocker arm housing of an aircraft engine to relieve the push rod thereof comprising, a tubular body having one end adapted to receive a hand lever and the other end adapted to slidably then fixedly engage the valve extremity of a rocker arm, and means for adjustably spacing the first mentioned end of said tubular body from a predetermined portion of said rocker arm housing.

4. A valve spring compressor and lock adapted to be applied to the rocker arm of a valve gear assembly located in the rocker arm housing of an aircraft engine to relieve the push rod thereof comprising, a tubular body having one end adapted to receive a hand lever and the other end adapted to slidably then fixedly engage the valve extremity of a rocker arm, and screw means for adjustably spacing the first mentioned end of said tubular body from a predetermined portion of said rocker arm housing.

5. A valve spring compressor and lock adapted to be applied to the rocker arm of a valve gear assembly located in the rocker arm housing of an aircraft engine to relieve the push rod thereof comprising, a tubular body provided at one extremity with external lugs and internally adapted to receive a hand lever and further adapted at its other extremity to slidably then fixedly engage the valve extremity of a rocker arm, and a turnbuckle pivotally secured at one extremity to the external lugs of said tubular body and having its other extremity terminate in a yoke adapted to engage a predetermined portion of said rocker arm housing for locking the lugged extremity of said tubular body in spaced relationship to said predetermined portion of said rocker arm housing.

BRUCE W. BAUGHMAN.